April 12, 1927.
T. DECOT
1,624,587
SIREN
Filed Oct. 5, 1921
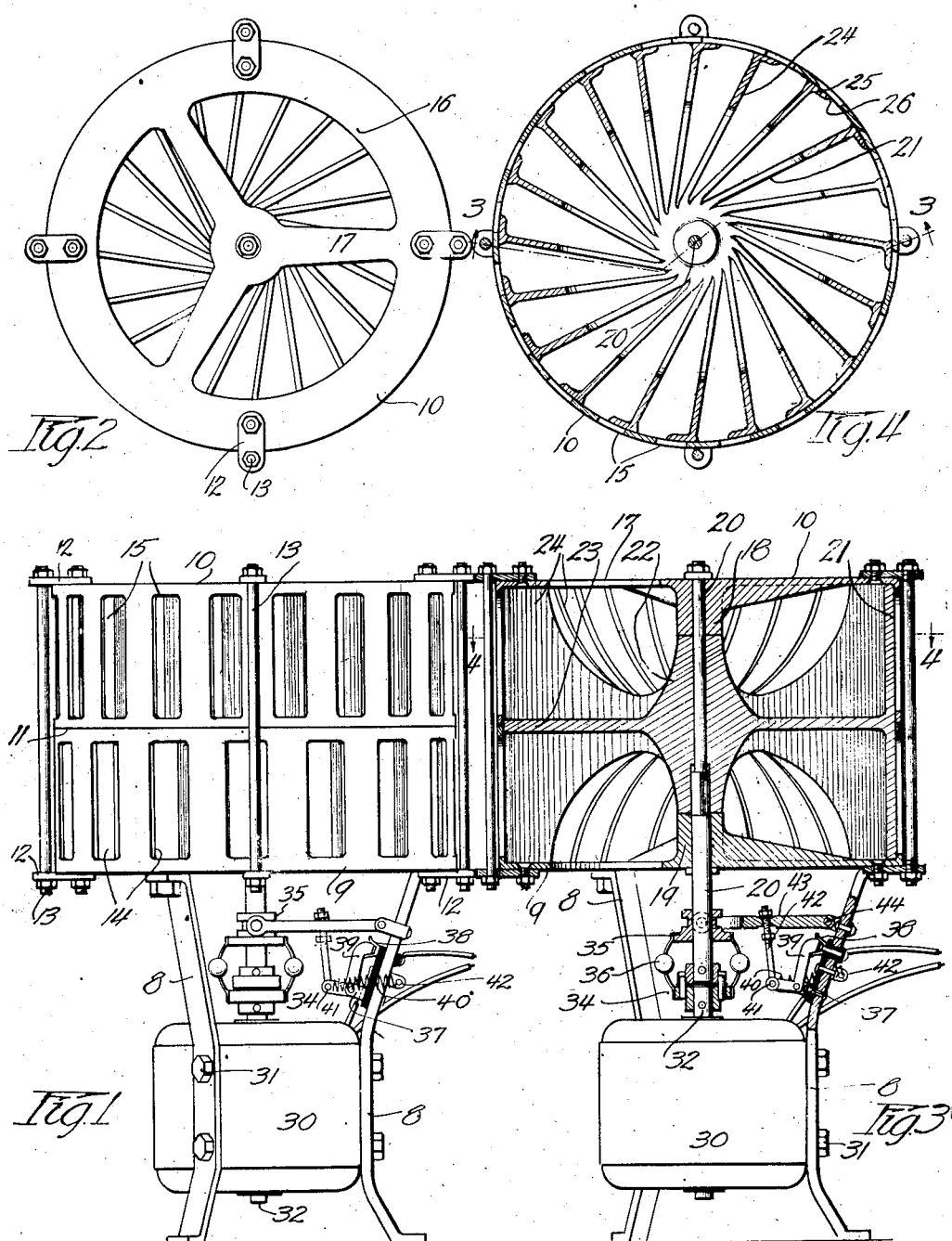

Patented Apr. 12, 1927.

1,624,587

UNITED STATES PATENT OFFICE.

THEODORE DECOT, OF SAUK CITY, WISCONSIN.

SIREN.

Application filed October 5, 1921. Serial No. 505,623.

My invention relates to sirens and operating mechanism therefor. The objects of my invention are:

First: To provide a device capable of producing a sound of high pitch that will penetrate for long distances, Second: To provide a device that will produce a sound of low pitch that will be more sonorous in the near vicinity;

Third: The provision of a device that is more simple in construction than the devices heretofore in use;

Fourth: To provide a device that will be light in weight, compact, and economically manufactured;

Fifth: To provide a siren that will distribute its sound in all horizontal directions to the same degree, and Sixth: To provide operating mechanism for the siren which will automatically secure the rise and fall of pitch desired by opening and closing an electric circuit operating an electric motor connected with the siren rotor.

These and other objects of my invention will be clearly understood by reference to the accompanying description and drawings, in which Figure 1 is a view in elevation of the preferred form of my invention;

Figure 2 is a plan view of the device of Figure 1;

Figure 3 is a view partly in section and partly in elevation of the device of Figure 1, and Figure 4 is a sectional view taken on the line 4—4 of Figure 3 and looking in the direction indicated by the arrows.

Similar characters of reference refer to similar parts throughout the several views.

For convenience, I have arranged the siren, the support therefor, the motor, and contact making mechanism in a unitary structure. The base comprises a plurality of iron supports 8 being flanged at their lower ends to provide means for securing to the floor or other base. The supports are similarly flanged and suitably apertured at their upper ends to receive bolts threaded into the siren casing member 9.

The casing member 9 together with casing member 10 is cylindrical in shape, and these members are secured together by suitable bars and bolts 12 and 13 to form a unitary casing 11. The casing members 9 and 10 are each provided with apertures 14—14 and 15—15, the apertures 14—14 being larger and of lesser number than the row of apertures 15—15 in the casing member 10. It will be noted that some of the apertures of one row are offset with respect to the apertures of the adjacent row.

The unitary casing 11 is open at its upper and lower ends, the casing members 9 and 10 being flanged inwardly as at 16 with inwardly extending arms 17 terminating centrally to provide bearings 18 and 19 for the rotor shaft 20. Rotatably mounted with the rotor shaft 20 is a drum or rotor 21 having a hub portion 22 and a central dividing wall 23. Extending from points adjacent the center of the rotor on each side of the central wall 23 are a plurality of blades 24 which terminate in the outer peripheral wall of the drum. The outer peripheral wall referred to is made up of flanges 25 formed at the outer ends of the blades 24. Extending forwardly from the leading edge of each blade is a relatively narrow lip 25′, the surface of which slopes forwardly. Defined between the flanges 25 on the trailing edges and the lips 25′ on the leading edges are the slots 26 which permit the egress of a blast of air from the siren rotor when the same is in operation.

As illustrated, the drum 21 is preferably made as an integral structure including the hub, central wall and blades, the blades being narrowed at the hub portion and extending outwardly to provide pockets at the peripheral portions of the drum. As in the case of the members 9 and 10, the apertures 26 of the lower row are larger and of greater number than the apertures of the upper row. The apertures 26 in the upper and lower chambers of the drum co-operate with the apertures 14—14 and 15—15 of the casing members 9 and 10. In the device, the smaller apertures provided in the upper row produce a sound of high pitch, and the lower row of larger apertures produce a sound of lower pitch.

In the operation of the device, the air is drawn inwardly through the open ends of the casing and thrown outwardly towards the pockets formed by the blades 24 and flanges 25. The sound, of course, is produced by the egress of the blast of air from the pockets through the apertures 26 of the rotor and the apertures in the casing. The object of having the apertures 26, 14—14 and 15—15 offset, as described, is to secure a harmonious sound in the operation of the device.

An electric motor 30 is supported by nuts 31 between the members 8 and has its motor shaft 32 connected in a suitable manner with the rotor shaft 20. A governor mechanism 34 connected with a sleeve 35 by means of a centrifugal device 36 is mounted between the motor and the siren by means of which automatic operation of the siren is obtained. An electric contact mechanism is mounted on one of the supports 8 and comprises contacts 37 and 38 arranged to be connected by means of a bell crank lever 39 pivoted to the member 37. A spring 40 connected to the bell crank lever at 41 at one end and to the stationary member 42 at the other end is arranged to hold the bell crank in either one of two positions to close or open the electric circuit operating the motor 30.

Secured to the end 41 of the bell crank lever is an arm 42 connected with a lever 43 pivoted at 44 to the stationary member 8. The opposite end of the lever 43 is connected to the sleeve 35 so that as the speed of the motor 30 increases, the sleeve 35 travels downwardly and carries with it the lever 43 and thus actuates the bell crank lever 39 by means of the arm 42.

From the foregoing description, it will be clear that when the speed of the siren falls below a predetermined rate, the sleeve 35 being in upper position the bell crank lever 39 will make an electrical contact whereby the siren is operated. As the siren attains a predetermined speed, the governor sleeve travels downwardly and operates to disconnect the bell crank lever from the contact 38 and this contact remains broken until the sleeve again travels upwardly due to a decrease in speed, at which time the contact is again made. As sirens are used for signalling purposes and it is desired to secure a rise and fall of pitch intermittently, the arrangement I have described and illustrated automatically takes care of this requirement.

While I have illustrated a siren mechanism having a support and an electric motor carried by the same support, I am aware that in some instances it will be desirable to locate the motor or driving mechanism a considerable distance from the sound producing means. By virtue of the vertical disposition of the parts, it will be feasible to locate the sound producing means in a belfry, for instance, and the motor or driving mechanism within the building. In this case, a shaft of considerable length may be arranged to connect the siren with the motor.

What I claim as new and desire to secure by Letters Patent is:

1. In a vertically disposed air siren for projecting upper and lower sound wave bands of different frequencies, the combination of a vertically extending rotor shaft, a cylindrical casing mounted axially of said rotor shaft, said casing having an upper series of apertures and a lower series of apertures, said upper series of apertures exceeding in number said lower series of apertures whereby said upper series of apertures will project an upper band of sound waves of relatively high frequency for projecting sound to a great distance, and said lower series of apertures will project a lower band of sound waves of relatively low frequency for the immediate locality, a rotor in said casing mounted on said vertical shaft, said rotor comprising a central web portion disposed in a plane between said upper and lower series of apertures, an upper series of substantially flat blades formed integral with said web portion, a lower series of substantially flat blades formed integral with said web portion, said upper series having a greater number of blades than said lower series, and circumferentially extending flanges projecting from the outer ends of said blades the advancing portion of each flange being to the rear of a plane passing through the axis of rotation and the center of the impelling surface of each blade whereby a free expulsion of air is permitted through the apertures in the casing.

2. In an air siren of the class described, the combination of a cylindrical casing having a plurality of apertures therein, a rotor in said casing, said rotor comprising a hub, a series of blades of flat, planar form extending outwardly and tangentially from said hub, the inner portion of each of said blades being of relatively narrow width axially of the rotor and the outer portion being of relatively wide width to form an annular air space adjacent said hub, flanges extending from the trailing edges of each of said blades, and relatively narrow sloping lips extending from the leading edges of the blades, but terminating short of a plane passing radially through the rotor axis and the center of the impelling surface of each blade, the combined width of each flange and its associated lip being substantially equal to the width of each aperture in said casing.

3. In an air siren of the class described, the combination of a circular casing having a plurality of apertures therein, a rotor in said casing, said rotor comprising a hub, a plurality of blades extending outwardly from said hub and tangentially thereof, all portions of each blade lying within a flat plane, relatively wide flanges extending from the trailing edges of said blades, and relatively narrow lips extending from the leading edges of said blades, the said lips terminate short of a plane passing radially through the rotor axis and the center of the impelling surface of each blade.

4. In an air siren of the class described, the combination of a circular casing having a plurality of apertures therein, a rotor in said casing, said rotor comprising a hub, a series of blades extending outwardly from said hub, all portions of the leading surfaces of said blades lying in a flat plane extending tangentially of said hub, and flanges extending from the trailing edges of said blades.

In witness whereof, I hereunto subscribe my name this 30th day of Sept., 1921.

THEODORE DECOT.